G. W. KONE.
SEED PLANTER.
APPLICATION FILED JUNE 30, 1915.
1,217,780.
Patented Feb. 27, 1917.
2 SHEETS—SHEET 1.
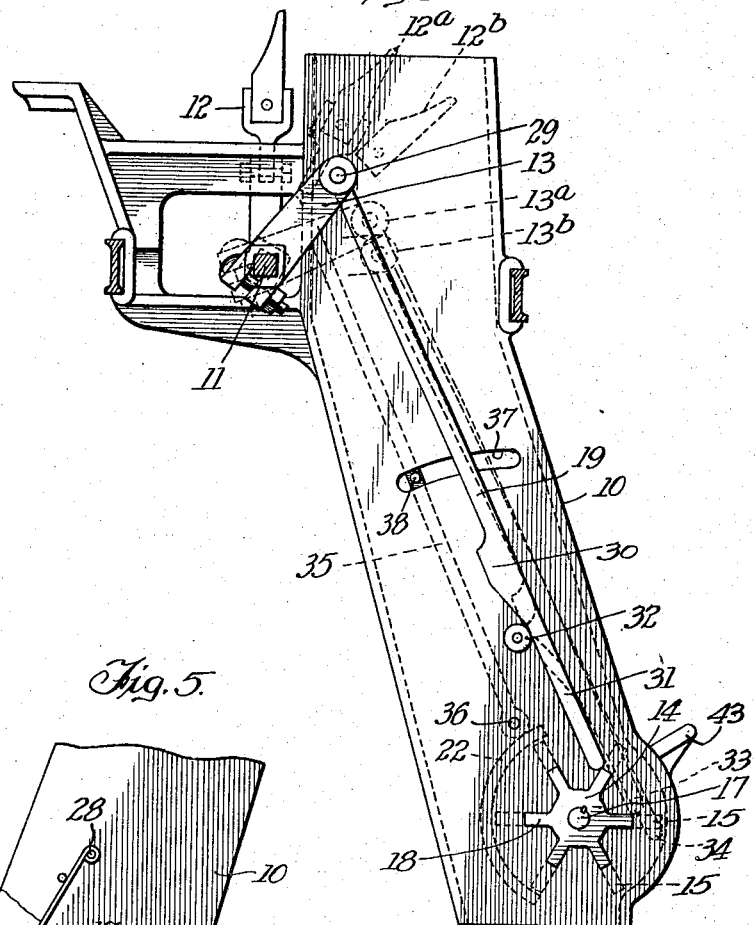
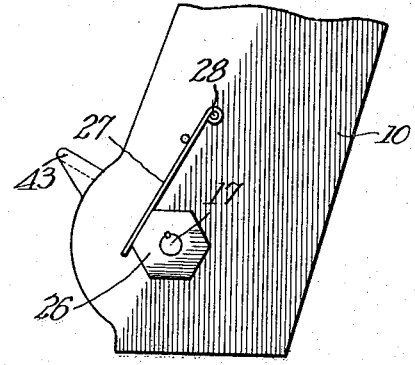
Witnesses:
Robert F. Weir
Arthur W. Carlson
Inventor:
George W. Kone
By Foree Bain O'Mery
Attys.

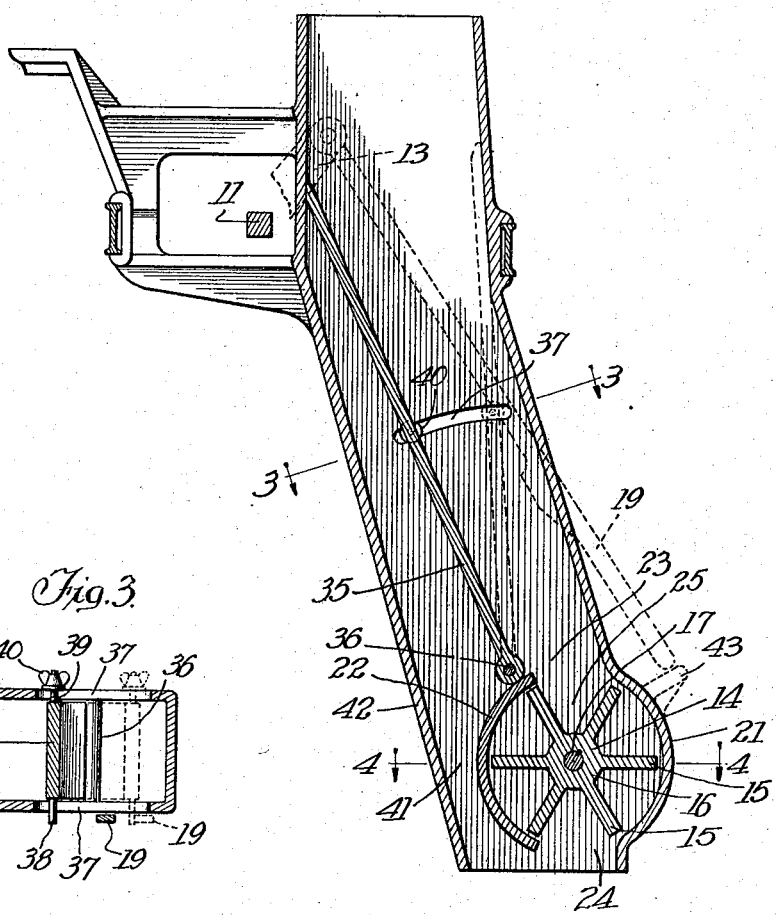
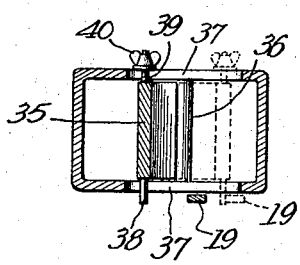
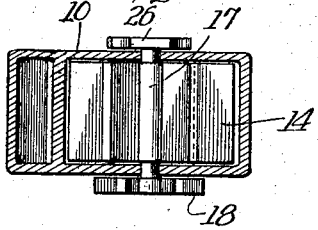

UNITED STATES PATENT OFFICE.

GEORGE W. KONE, OF ROCK ISLAND, ILLINOIS, ASSIGNOR OF ONE-HALF TO STEPHEN R. SPENCER, OF ROCK ISLAND, ILLINOIS.

SEED-PLANTER.

1,217,780.

Specification of Letters Patent.   Patented Feb. 27, 1917.

Application filed June 30, 1915.   Serial No. 37,157.

*To all whom it may concern:*

Be it known that I, GEORGE W. KONE, a citizen of the United States, residing at Rock Island, in the county of Rock Island and State of Illinois, have invented certain new and useful Improvements in Seed-Planters, of which the following is a specification.

My invention relates to improvements in seed planters and has more particular reference to devices of this character generally known as corn planters.

One of the objects of my invention is to provide improved seed dropping means whereby to more accurately and uniformly place the seeds in the row after they have left the seed plate, and which is so constructed that it will not catch the seeds and crush them between relatively stationary and movable parts.

Another object of my invention is to provide an improved and simplified means for quickly and conveniently adjusting the device so that it will either "hill" or "drill" the seed in accordance with the respective adjustments.

Another object of my invention is to provide means whereby the hilling mechanism will become inoperative by the act of adjusting the device for drilling and remain so until adjustment is made to restore the parts to normal position for hilling.

Other and further objects of my invention will become readily apparent to persons skilled in the art, from a consideration of the following description when taken in conjunction with the drawings, wherein:—

Figure 1 is a side elevation of a boot of a planter, showing the parts in full lines, in positions for hilling.

Fig. 2 is a central, vertical section of the parts shown in Fig. 1, showing in dotted lines the parts in their respective positions for drilling.

Fig. 3 is a transverse section taken on lines 3—3 of Fig. 2.

Fig. 4 is a similar view taken on lines 4—4 of Fig. 2.

Fig. 5 is a fragmentary side elevation showing the yielding ratchet means for holding the seed valve in place.

In all the views the same reference characters are employed to indicate similar parts.

10 is the boot of the machine, consisting of a relatively long tubular structure, of rectangular cross-section, of the same general character as of similar devices employed in corn planters, wherein this part of the structure connects the shoe of the planter with the seed plate and through which the seeds pass from the seed plate to their positions of deposit in the row in which they are to be planted.

11 is the angular rocker shaft, as of planters of this general type, operated by the check wire engaging arm 12. Secured to the rocker shaft 11 is the ratchet arm 13, which is adapted to operate a ratchet mechanism for causing the proper intermittent motion of the seed valve or wheel for distribution of the seeds in hills, in my new improved planter, every time that the rocker arm 12 is moved by engagement with the check wire.

In devices of this general character heretofore, a valve, comprising a plurality of pieces, is located near the top of the boot, which controls the receptacle in which the seeds are first received from the seed plate, they are then dropped from this receptacle by the quick opening of the valve to another similar receptacle, located at the bottom of the boot, from which latter receptacle they are dropped into the row in the ground. Both of these valves are of such character as to require the utmost fidelity of movement to prevent crushing of the seeds. Inasmuch as the seed plate is moved to drop the seed into the first named receptacle by the same mechanism which controls the valve of the receptacle in which the seeds are caught, the valve must be moved to drop the seed previously caught and return to its initial position and close the receptacle completely before the seeds have fallen from the seed plate into the receptacle controlled by the valve. In such mechanism, the seeds are frequently caught between the movable valve part and the relatively stationary part of the boot and injured and some times resulting in clogging the valve port. Similar objections and defects exist in the operation of valves of this same general character which are located in the bottom of the boot.

The greatest desideratum in a seed planter is integrity of operation and the accuracy with which the seeds are bunched and placed in the hill without danger of mixing the hills or "stringing" the seed.

To overcome the objections enumerated

I provide near the bottom of the boot, and within the boot, a valve wheel or spider 14, having a series of arms 15 of uniform length, radiating from a central hub 16, to provide movable seed pockets between adjacent arms and the walls of the boot. The wheel or spider valve is secured to a shaft 17 that is journaled in the side walls of the boot 10. A similar spider 18 having shorter, but the same number of arms, is placed on the outside of the boot and is also secured to the shaft 17. The spider 18 operates in conjunction with the pawl 19 as a ratchet means for intermittently moving the seed feeding valve. A portion of the outer, rear wall of the boot, near the lower end thereof, as at 21, is outwardly deflected upon a radius taken from the center of the shaft 17, and a similar partition 22, is made in the boot and curved upon the same radius, leaving an open space 23 between the curved wall 21 and the wall 22 and another diametrically opposite open space at the lower ends of these walls, as at 24. Each of the spaces between the valve arms 15, form pockets 25 into which the seed is received through the opening 23 and from which it is deposited through the opening 24 as the seed valve is rotated. A hexagonal plate 26 is secured to the shaft 17, on the opposite side to that upon which the ratchet 18 is secured, this plate is provided with as many flat faces as there are spokes in the seed valve 14 and a spring 27, pivoted as at 28, has bearing upon the flat faces of the plate 26, so that when the pawl 19 moves the seed valve by its engagement with the arms of the ratchet 18, the spring 17 will hold the valve in the position in which it has been placed by the pawl.

The pawl 19 is pivotally secured to the rocker arm 13, as at 29. When the rocker arm 13 is in the position shown in full lines in Fig. 1, the lower end of the pawl 19 will rest upon one of the arms of the ratchet wheel 18. The pawl 19 is provided, intermediate its ends, with a laterally enlarged portion 30, which taperingly decreases in size to the normal width of the pawl, as at 31, where it normally rests upon a roller 32. When the rocker arm 12 is moved rearwardly, as by its engagement with the check wire, (not shown) it moves the arm 13 downwardly, as shown in dotted line position, as at 13ª and 13ᵇ, whereupon the engagement of the pawl with the ratchet 18 will move the seed valve a distance equivalent to the distance between the arms of the seed wheel.

To provide against failure of operation of the seed valve, by the reciprocation of the pawl 19, I so arrange the mechanism that when the pawl has moved only a portion of its excursion the seed wheel will have been moved thereby a proper distance, and the operation of the pawl thereafter will be ineffective. When the lower end 31 of the pawl has been moved to the position shown by dotted lines, as at 33, the spring 27 will engage the flat surface of the next succeeding portion of the plate 26 and hold the seed valve in the position in which it has been moved. About this time the roller 32, engaging the enlargement 30 of the pawl, will have caused the lower end 31 of the pawl to be moved out of range of the arm on the ratchet but the pawl will continue its movement until the rocker arm 12 occupies substantially the position shown in dotted lines at 12ᵇ. The movement of the pawl, from the position 33 to the position 34 is idle, so far as the rotation of the seed valve is concerned.

When the seed valve has been moved into the position shown in Fig. 1 the seeds will drop from the seed plate, through the boot, into the pocket or receptacle 25 between adjacent arms and in this receptacle the seed will be inclosed and retained by the surrounding walls of the boot until the seed valve has made a half revolution; the next succeeding pocket, or receptacle, receiving a similar number of seeds in the intermittent rotation of the seed valve. When the succeeding arm 15 is about to enter the opening 24, the seeds in the following pocket will be resting upon this arm and they will be simultaneously dropped from the seed wheel into the furrow. As the seed valve is intermittently rotated, an empty pocket will be presented in register with the receiving opening 23 to receive the seeds and simultaneously a diametrically opposite pocket will be presented in register with the discharge opening 24 to permit the seed therein to drop from the valve.

When the rocker arm 12 is returned to its normal operative position, the arm 13, being fixed to the rocker shaft 11, will raise the pawl 19 so that the lower end 31 will again engage an arm on the ratchet 18 and by this means the seed wheel is positively and reliably rotated to present the succeeding pockets to receive the seeds and diametrically opposite pockets to discharge the seeds.

A longitudinally extending partition blade 35 placed within the boot 10, is pivoted therein, as at 36, with its lower end substantially in contact with the upper end of the crescent shaped wall 22. It may be moved from the full line position, in which position it remains when the hilling mechanism heretofore described is in operation, to the dotted line position, shown in Fig. 2, into which position it is moved when it is desired to substitute means for drilling the seed instead of bunching it in hills.

When the blade or partition 35 is in the position shown in full lines in Fig. 2, it serves as a guide for the seeds that leave the seed plate, located near the upper end of the boot (but not shown) through the opening 23 in the receptacle 25 of the seed valve. When shifted it serves as a bypass for the seed valve.

Curved slots 37—37' are made one in each of the side walls of the boot and projecting from the blade through these slots are pins 38 and 39, the latter being screw threaded for a butterfly clamping nut 40. When the device is to be used for drilling, the nut 40 is loosened and the plate 35 is pushed to the right, as shown in dotted lines in Fig. 2. This will shut off or bypass the passage way for the seeds through the opening 23, and permits them to pass on the opposite side of the blade through passage 41, between the wall 42 of the boot and the crescent shaped wall or partition 22. When this passage way is open the seeds will fall in rapid succession and at substantially uniform rate from the seed plate, to be located at the upper end of the boot, through the boot and into the furrow. When the blade 35 is in the position just described, to permit the device to drill the seeds, the pin 38 will engage the pawl 19 and lift it out of its normal position into that shown in dotted lines in Fig. 2, preventing it from engaging the ratchet 18. Projecting from one edge of the boot is an abutment 43 against which the end of the pawl 19 will be brought, if attempt be made to use the hilling mechanism while the blade 35 is in position to drill the seed, thus rendering it impossible to use the hilling mechanism while the device is in position for drilling. When the blade 35 is returned to the position shown in full lines in Fig. 2, the pawl 19 will follow the plate until it rests upon the roller 32, in operative position, ready to again move the valve.

While I have herein shown a single embodiment of my invention it is manifest that considerable variation may be made therefrom within the scope of the appended claims.

Having described my invention, what I claim is:

1. In a seed planter, the combination with a boot and a rocker shaft, of a valve; means operable from said shaft to actuate said valve, a movable partition in said boot to provide a bypass seed path around said valve and means for disabling the valve actuating means when said partition is so moved.

2. In a seed planter, the combination with a boot and a rocker shaft, of a rotary valve providing a circumferential series of seed pockets; means operable from said shaft to intermittently rotate said valve; a movable partition in said boot to provide a bypass seed path around said valve and means for disabling the valve operating means when said partition is so moved.

3. In a seed planter, the combination with a boot and a rocker shaft, of a rotary valve located near the bottom of the boot and having a series of circumferentially extending seed pockets; walls of a peripheral length exceeding the peripheral length of a pocket extending partly around the valve, on each side, leaving opposite openings in a substantially vertical plane and means operated from said shaft to intermittently move the valve to cause diametrically opposite pockets to register with the respective openings.

4. In a seed planter, the combination with a boot and a rocker shaft, of a rotary valve located near the bottom of the boot and having a series of circumferentially extending seed pockets; walls extending partly around the valve, on each side, leaving opposite openings in a substantially vertical plane; means operated from the said shaft to intermittently move the valve to cause opposite pockets to register with the respective openings; a movable partition in the boot, shiftable to bypass the valve and means to prevent operation of the valve when said partition is shifted.

5. In a seed planter, the combination with a boot and a rocker shaft, of a valve, means operable from said shaft to actuate said valve, a movable partition in said boot, to provide a by-pass seed path around said valve, and means actuated by the movement of the said partition for disabling the valve actuating means when the partition is moved into position to by-pass the seeds around the valve.

In testimony whereof I hereunto set my hand in the presence of two subscribing witnesses.

GEORGE W. KONE.

In the presence of—
  W. M. OHLWEILER,
  B. D. LAMONT.

Copies of this patent may be obtained for five cents each, by addressing the "Commissioner of Patents, Washington, D. C."